United States Patent
Siddiqui et al.

(10) Patent No.: US 10,151,933 B2
(45) Date of Patent: Dec. 11, 2018

(54) APPARATUS AND OPTICAL SYSTEM INCLUDING AN OPTICAL ELEMENT

(71) Applicant: SONY CORPORATION, Tokyo (JP)

(72) Inventors: Muhammad Siddiqui, Stuttgart (DE); Muhammad Arsalan, Boeblingen (DE)

(73) Assignee: SONY CORPORATION, Tokyo (JP)

( * ) Notice: Subject to any disclaimer, the term of this patent is extended or adjusted under 35 U.S.C. 154(b) by 242 days.

(21) Appl. No.: 15/102,218

(22) PCT Filed: Dec. 19, 2014

(86) PCT No.: PCT/EP2014/003448
§ 371 (c)(1),
(2) Date: Jun. 6, 2016

(87) PCT Pub. No.: WO2015/090611
PCT Pub. Date: Jun. 25, 2015

(65) Prior Publication Data
US 2016/0306184 A1    Oct. 20, 2016

(30) Foreign Application Priority Data

Dec. 20, 2013   (EP) .................................... 13005997

(51) Int. Cl.
*H04N 13/128*   (2018.01)
*H04N 13/204*   (2018.01)
(Continued)

(52) U.S. Cl.
CPC .......... *G02B 27/58* (2013.01); *G02B 27/0911* (2013.01); *G02B 27/0927* (2013.01);
(Continued)

(58) Field of Classification Search
CPC ............... G02B 27/58; G02B 27/0911; G02B 27/0927; G02B 27/0988; G06T 5/003; H04N 13/0022; H04N 13/0203
See application file for complete search history.

(56) References Cited

U.S. PATENT DOCUMENTS 5,965,330 A * 10/1999 Evans .................... A61F 2/147
351/159.01
7,705,970 B2   4/2010 Piestun et al.
(Continued)

FOREIGN PATENT DOCUMENTS

AU        2011265379 A1    7/2013

OTHER PUBLICATIONS

International Search Report and Written Opinion dated Mar. 11, 2015, in PCT/EP2014/003448 filed Dec. 19, 2014, 10 pages.
(Continued)

*Primary Examiner* — Twyler Haskins
*Assistant Examiner* — Fayez Bhuiyan
(74) *Attorney, Agent, or Firm* — XSENSUS LLP

(57) ABSTRACT

An optical system includes an optical element arranged in an optical path of an optical system. A point spread function of the optical element images out-of-focus object points with positive defocus value into image areas oriented along a first radial axis in an image plane and out-of-focus object points with negative defocus value into image areas oriented along a second radial axis in the image plane. A distance of the image areas to an optical axis of the optical system increases with increasing absolute defocus value.

20 Claims, 15 Drawing Sheets

(51) Int. Cl.
  *G02B 27/42* (2006.01)
  *G06T 5/00* (2006.01)
  *G02B 27/58* (2006.01)
  *G02B 27/09* (2006.01)

(52) U.S. Cl.
  CPC .......... *G02B 27/0988* (2013.01); *G06T 5/003* (2013.01); *H04N 13/128* (2018.05); *H04N 13/204* (2018.05)

(56) References Cited

U.S. PATENT DOCUMENTS

| 2011/0310226 | A1 | 12/2011 | McEldowney |
| 2012/0057072 | A1 | 3/2012 | Yamashita |
| 2016/0125610 | A1* | 5/2016 | Piestun .............. H04N 13/0203 348/46 |

OTHER PUBLICATIONS

Quirin, S.A., "Quantitative Optical Imaging and Sensing by Joint Design of Point Spread Functions and Estimation Algorithms" UMI Dissertation Publishing, UMI No. 3508028, (2012), 249 pages.

Pavani, S.P., "Three-Dimensional nanoscopy with a Double-Helix Microscope", UMI Dissertation Publishing, UMI No. 3387520, (2009), 169 pages.

Hatzvi, M.R. et al.. "Three-dimensional optical transfer of rotating beams", Optics Letters, vol. 37, No. 15, (2012), pp. 3207-3209, XP-001577519.

Piestun, R. et al., "Wave fields in three dimensions: analysis and synthesis", J. Opt. Soc. Am. A, vol. 13, No. 9, (1996), pp. 1837-1848.

Wang, Z. et al., "Local Phase Coherence and the Perception of Blur", Advances in Neural Information Processing Systems, vol. 16, MIT Press, (2004), 8 pages.

Paris, S. et al., "A Fast Approximation of the Bilateral Filter Using a Signal Processing Approach", Int. J. Comput Vis, vol. 81, (2009), pp. 24-52.

Quarteroni, R. et al., "Numerical Integration and Differentiation", Springer, (2006), 11 pages.

Grover, G. et al., "New approach to double-helix point spread function design for 3D super-resolution microscopy", Proceedings of SPIE, vol. 8590, (2013), 6 pages, XP055173404.

* cited by examiner

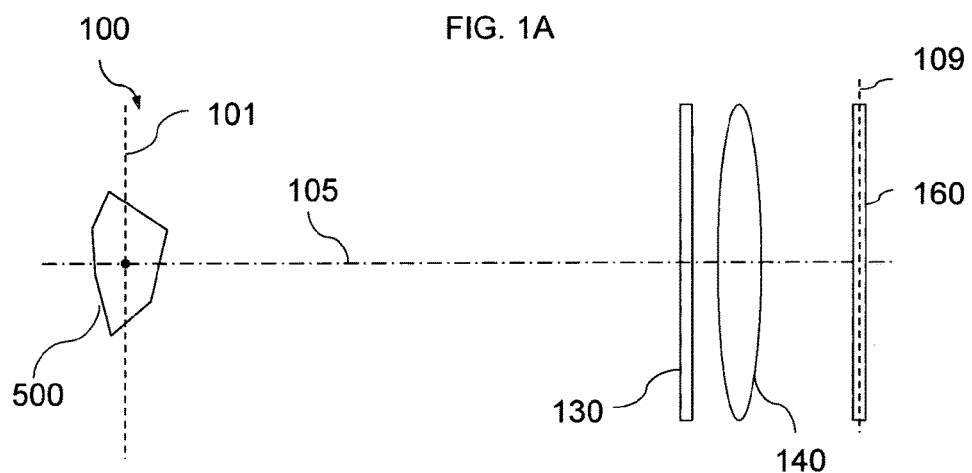
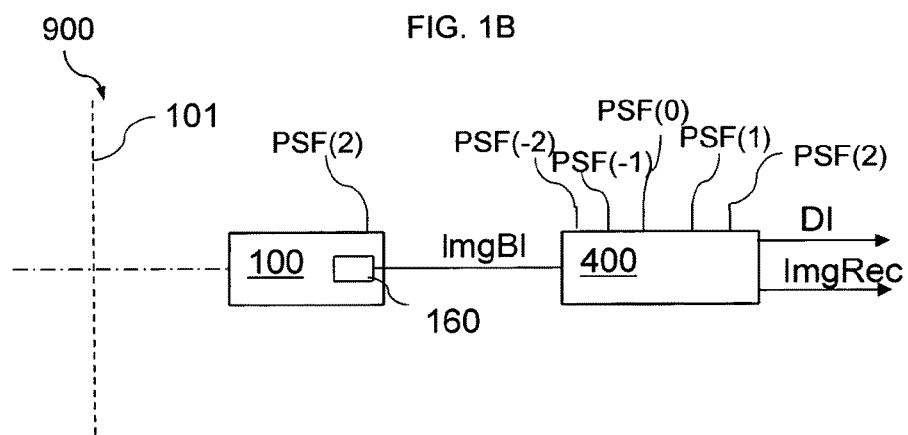
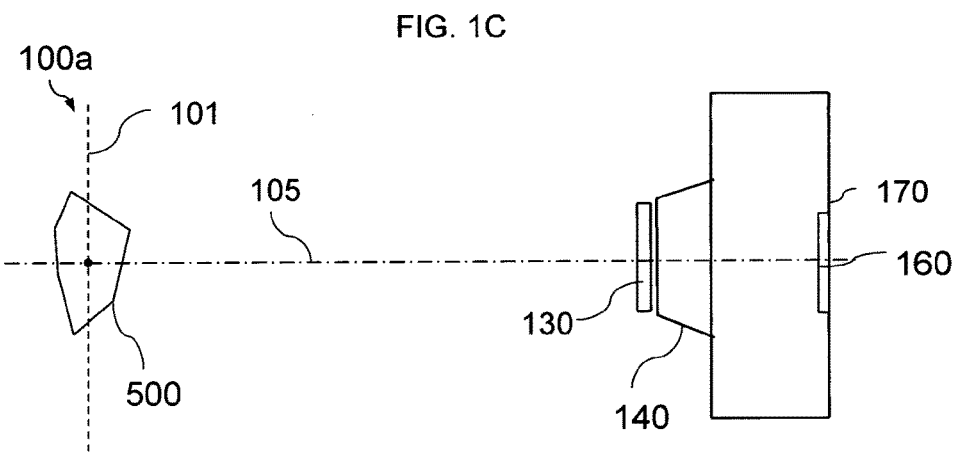

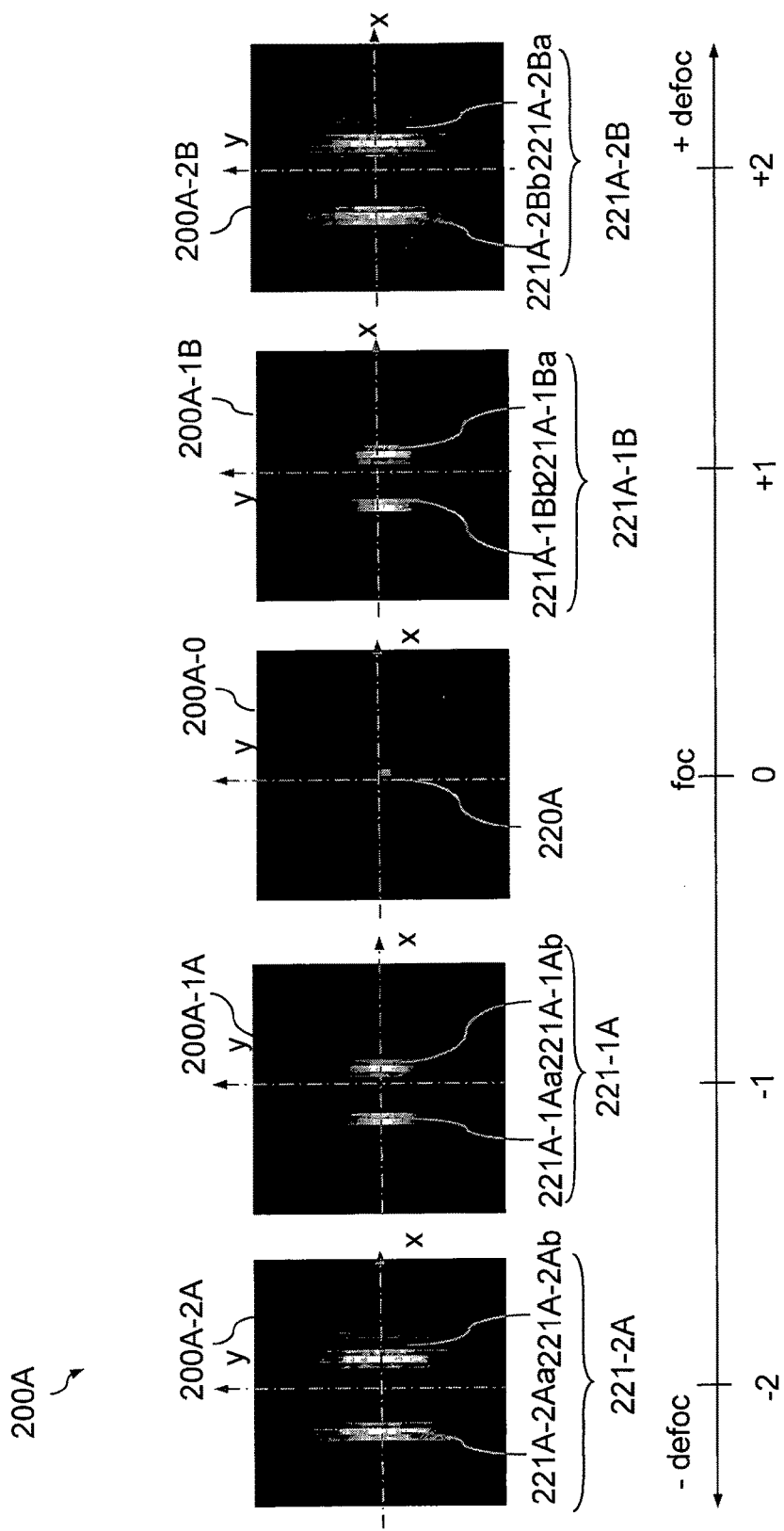

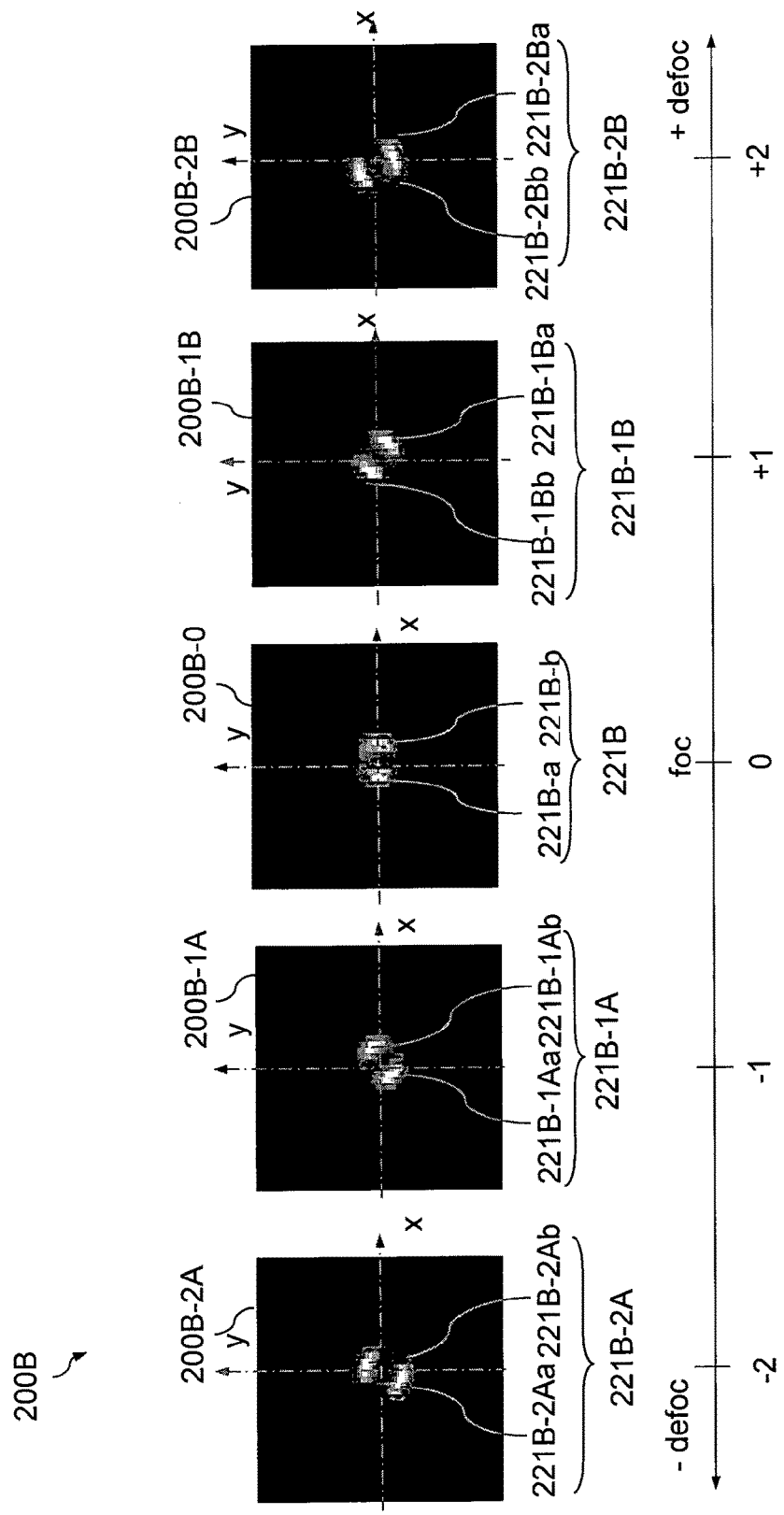

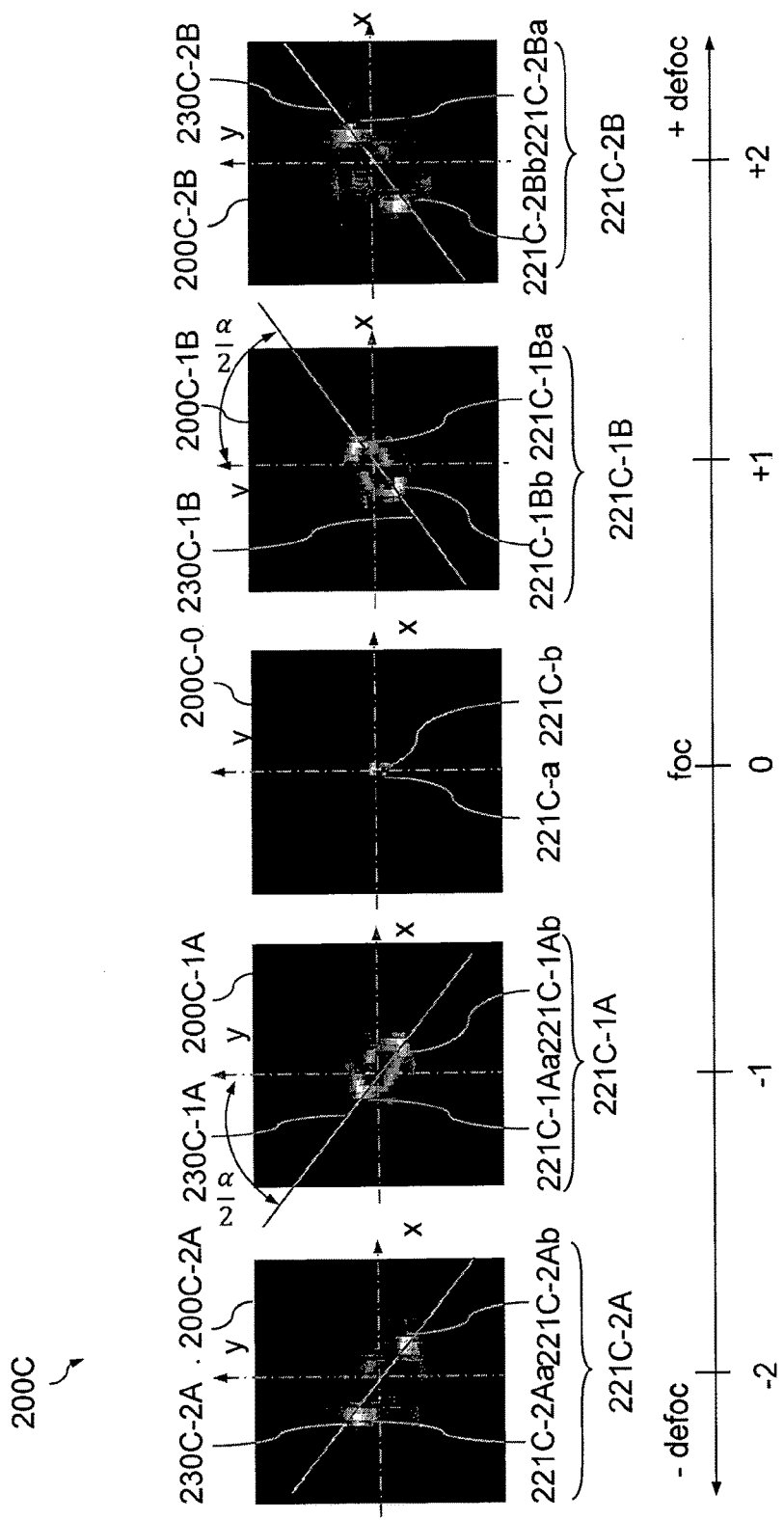

150

$X_{-3}$  $X_{-2}$  $X_{-1}$  $X_0$  $X_1$  $X_2$  $X_3$

APPARATUS AND OPTICAL SYSTEM INCLUDING AN OPTICAL ELEMENT

CROSS-REFERENCE TO RELATED APPLICATIONS

The present application is based on PCT filing PCT/EP2014/003448 filed Dec. 19, 2014 and claims priority to European Patent Application 13005997.5 filed by the European Patent Office on 20 Dec. 2013, the entire contents of each of which being incorporated herein by reference.

BACKGROUND

Field of the Disclosure

The present disclosure relates to an optical system including an optical element which is arranged in an optical path of the optical system and whose PSF (point spread function) is suitable for depth estimation. The disclosure further relates to an apparatus including an optical system as well as a method of operating an electronic device including the optical system.

Description of Related Art

Digital imaging systems capture light from 3D scenes and project the captured light onto a 2D image sensor arranged in an image plane. Typically, depth information is lost. Some approaches aim at restoring the depth information by using a phase mask whose PSF rotates with defocus and comparing the resulting blurred image with an unblurred reference image. There is a need for improved optical systems providing depth information. The object of the present embodiments is achieved by the subject matter of the independent claims. The dependent claims define further embodiments.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

According to an embodiment an optical system includes an optical element arranged in an optical path of the optical system. A point spread function of the optical element is configured to image out-of-focus object points with positive defocus values into image areas oriented along a first radial axis in an image plane and out-of-focus object points with negative defocus values into image areas oriented along a second radial axis in the image plane. A distance of the image areas to an optical axis of the optical system increases with increasing absolute defocus values.

Another embodiment relates to a method of operating an electronic device including an optical system. A scene is imaged onto an image sensor, wherein an optical element arranged in an optical path of the optical system images out-of-focus object points with positive defocus values into image areas oriented along a first radial axis and out-of-focus object points with negative defocus values into image areas oriented along a second radial axis. A distance of the image areas to an optical axis of the optical system increases with increasing absolute defocus values.

According to another embodiment an apparatus comprises optical means for imaging out-of-focus object points with positive defocus values into image areas oriented along a first radial axis in an image plane and out-of-focus object points with negative defocus values into image areas oriented along a second radial axis in the image plane, wherein a distance of the image areas to an optical axis of the optical system increases with increasing absolute defocus values.

BRIEF DESCRIPTION OF THE DRAWINGS

In the following drawings, like reference numerals designate identical or corresponding parts throughout the several views. The elements of the drawings are not necessarily to scale relative to each other. Features of the illustrated embodiments can be combined with each other to form yet further embodiments.

FIG. 1A is a schematic block diagram of an optical system including an optical element according to an embodiment.

FIG. 1B is a schematic block diagram of an apparatus including an optical system and an image processor for depth estimation and defocus image recovery according to another embodiment.

FIG. 1C is a schematic block diagram of an optical system including an optical element according to an embodiment providing an illumination system.

FIG. 2A is a schematic diagram illustrating a SPSF (scaled point spread function) of an optical element at different defocus planes.

FIG. 2B is a schematic diagram illustrating a RPSF (rotating point spread function) of an optical element at different defocus planes.

FIG. 2C is a schematic diagram illustrating an FPSF (fluctuating point spread function) of an optical element at different defocus planes according to an embodiment.

DESCRIPTION OF THE EMBODIMENTS

Figure 3A:
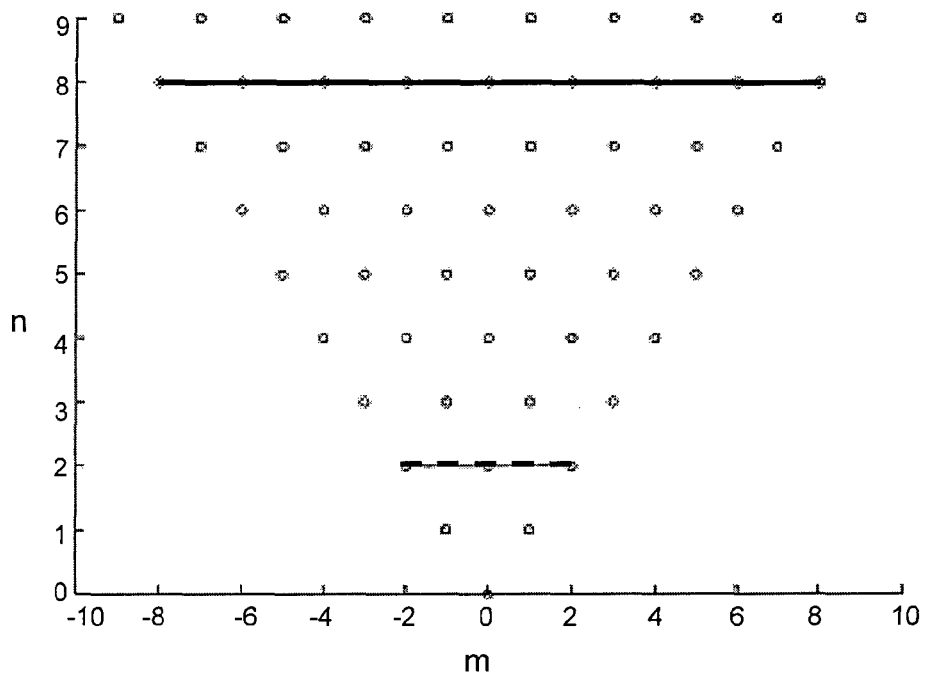
FIG. 3A is a schematic diagram plotting GL (Gauss-Laguerre) modes for generating SPSF masks in a GL modal plane.

FIG. 1A shows a portion of an optical system 100, which may be integrated in an apparatus, e.g. in an optical imaging device like a microscope, a camera, or a telescope for consumer, industrial, surveillance, medical, research, entertainment or military applications, respectively, a 3D imaging apparatus including a screen for 3D imaging, an apparatus for manipulating objects, for example in an assembly line, or an apparatus including a motion capture system, for example a game console.

The optical system 100 includes a lens system 140 focusing an image of a scene 500 in an object plane 101 onto a surface of an image sensor 160 arranged in an image plane 109. The lens system 140 may include, for example, one or more optical lenses that focus light received from the object plane 101 into the imaging plane 109. The lens system 140 may include a single lens or a plurality of lenses arranged for zooming, focusing and/or aperture modification. According to other embodiments the lens system 140 may include further optical elements like polarizers and color filters.

The image sensor 160 may include a plurality of pixel sensors arranged in a matrix, wherein each pixel sensor converts incident light irradiating on the pixel sensor into an electric current whose magnitude is a function of the light intensity detected by the pixel sensor. The image sensor 160 may be or may include a CCD (charge coupled device) sensor or a CMOS (complementary metal oxide semiconductor) sensor, by way of example. The image sensor 160 may include a color filter array such that pixels of a pixel subset are sensitive to two or more, for example, three different wavelength ranges.

An optical element 130 is arranged in an optical path of the optical system 100 between the object plane 101 and the image plane 109, wherein the optical path may be circular symmetric with respect to an optical axis 105 of the optical system 100. For example, the optical element 130 may be arranged between the object plane 101 and the lens system 140. According to other embodiments, the optical element 130 may be integrated in the lens system 140. The optical element 130 may extend over the complete aperture of the optical system 100 at the respective position on the optical axis 105. A center point of the optical element 130 may be on the optical axis 105.

The optical element 130 may be a mask, a diffractive optical element, a hologram, a shaped aperture, or a kinoform, by way of example. The optical element 130 may be a one-piece element or may include two or more components which may be in direct contact with each other or which may be spaced apart from each other along the optical axis 105. According to an embodiment, the optical element 130 includes a phase mask as a first component and an amplitude mask as a second component.

The optical element 130 or one, some or all of its components may be discrete elements spatially separated from other components of the optical system 100 and/or other components of the optical element 130. According to other embodiments, the optical element 130 or at least one of its components may be implemented by other components of the optical system 100 or may be attached to other components. For example, a component of the optical element 130 may be a coating on an optical lens of the lens system 140.

The optical element 130 may be a static device whose PSF remains stable in the application. According to other embodiments, the optical element 130 may be a controllable device whose PSF can be changed in-situ in response to changing scenes, lighting conditions, or user presettings, by using a spatial light modulator. For example, the optical element 130 may consist of or include an LC (liquid crystal), a device suitable for electro-optic modulation, a microfluid, or a micro electro mechanical system. According to an embodiment, the optical element 130 is a controllable device whose PSF can be switched between two or more differently defined PSFs.

The imaging characteristic of the optical element 130 is described by its PSF, wherein the optical element 130 convolves a received image from the scene 500 with its PSF to obtain a blurred defocus image ImgBI from the scene 500. The introduced blur depends on a distance between an object contained in the scene 500 and the object plane 101. The PSF of the optical element 130 is an FPSF ("fluctuating" PSF).

The optical element 130 implementing an FPSF (FPSF mask) introduces a defined blur into the image projected onto the image sensor 160. The introduced blur depends on the distance (defocus) between the concerned out-of-focus object and the object plane 101 and on whether the concerned object is before or behind the object plane 101 with regard to the image sensor 160. The FPSF mask images an object point in the object plane 101 into an image area in the image plane 109.

The FPSF mask translocates out-of-focus object points at positive defocus between the optical plane 101 and the image sensor 150 mainly along a first axis and translocates out-of-focus object points at negative defocus having a greater distance to the image sensor 150 than the object plane 101 mainly along a second axis. An angle α between the first and second axes is for example larger than 10 degrees and less than 180 degrees. According to an embodiment the angle α is for example about 90 degrees.

The FPSF mask may further spread or blur object points outside the object plane 101 into image areas greater than the first image area for focused imaging, wherein the image areas increase with increasing distance between the object point and the object plane 101.

The combination of (i) imaging out-of-focus object points with positive defocus values into image areas oriented along a first radial axis in an image plane and out-of-focus object points with negative defocus values into image areas oriented along a second radial axis in the image plane, and (ii) increasing a distance of the image areas to an optical axis of the optical system with increasing absolute defocus values characterizes FPSFs.

It has turned out that other than, for example, RPSFs (rotational PSFs) FPSFs allow more light to arrive at the image sensor 150 such that the optical element 130 facilitates not only depth estimation but also full-color image recovery without requiring reference images from a second optical system. According to an embodiment the amount of light passing through the optical element 130 is at least 50%, for example at least 70% or at least 100% of the CA (clear aperture).

According to an embodiment the MTF of the optical element 130 may have a normalized value of at least 0.1 for at least 80% of vertical and horizontal spatial frequencies normalized with respect to mean or dc value, i.e. it is 1 at zero spatial frequency. According to another embodiment, the MTF of the optical element 130 is as good as that of CA (clear aperture).

Other than RPSFs that rotate with increasing defocus around a center point, FPSFs may have higher MTF values for a wider range of spatial frequencies. As a consequence, other than known RPSFs, the FPSF embodied in optical element 130 may be used both for obtaining depth information about objects in the imaged scene 500 and for recovering an un-blurred defocus image from the blurred defocus image at sufficient image quality. By contrast, conventional approaches using RPSFs typically rely on two captured images, for example, on two optical systems for obtaining, in addition to the blurred image, a reference image both as reference for depth estimation and for providing the un-blurred image information. Instead, the present embodiments may get along with one single optical system with one single optical path and one single image sensor.

FIG. 1B shows an apparatus 900 including the image system 100 of FIG. 1A and an image processor 400. The image processor 400 may be connected with the image sensor 160 of the optical system 100 and receives image information describing a blurred defocus image ImgBI which is the unblurred image convolved with the defocus dependent PSF(z). The image processor 400 has available a set of 2n+1 point spread functions PSF(−n) . . . PSF(+n) for the infocus plane and several different defocus planes, wherein n may be at least three, for example at least ten and wherein the defocus planes may be symmetric to the infocus plane.

The image processor 400 generates a set of candidate images by deconvolving the blurred defocus image ImgBI with each of the predetermined point spread functions PSF(−n) . . . PSF(+n). The image processor 400 may identify and discard such candidate images that are obtained by convolution with non-fitting PSFs by identifying and discarding over-enhanced images. For the remaining candidate images the image processor 400 may evaluate sharpness measures to identify the best fitting PSF. Identifying the best fitting PSF at the same time identifies the defocus value or depth of the concerned object or image section and provides depth information DI. In addition, the candidate image with the highest sharpness measure may represent the recovered defocus image ImgRec.

According to an embodiment related to imaging apparatuses, both the recovered defocus image ImgRec and the depth information DI may be transmitted to a video processor for calculating a 3D representation of the scene 500. According to other embodiments the recovered defocus image ImgRec and the depth information DI are combined to obtain 3D position and/or 3D motion information on one or more moving objects in the scene. The position and motion information may be transmitted to a handling unit interacting mechanically, hydraulically or in another way with one or more of the identified objects.

Before depth estimation and image recovery, the image processor 400 may partition the blurred defocus image ImgBI into a plurality of image sections and may apply depth estimation and image recovery for each image section or sets of image sections individually. The image sections may be regular image fields arranged in a matrix, wherein the image fields may or may not overlap with each other. According to other embodiments, the image processor 400 identifies objects in the blurred defocus image ImgBI and provides image sections assigned to single objects or group of objects and may or may not adjust contours of the image sections to the contours of the objects. Motion estimation may be used to identify moving objects, for example in a motion capture system.

The image processor 400 may further digitally filter the best-fitting candidate image, for example to reduce or eliminate artifacts generated by combining image sections including different depth information or to interpolate depth information of objects between the defocus planes for which PSFs are directly available.

The functionality of the image processor 400 may be completely realized in hardware, in software or as a combination thereof. For example, the image processor may be an IC (integrated circuit), and ASIC (application specific integrated circuit) or a DSP (digital signal processor).

FIG. 1C refers to an embodiment providing an optical element 130 which may be detachable mounted on optical devices 170, e.g., on or in front of an object lens of a DSLR (digital single lens reflex) camera or the object lens of a video camera. According to yet another embodiment, the optical element 130 may be implemented in the same housing as the object lens 140 and the image sensor 160.

According to an embodiment, the blurred defocus image ImgBI recorded with the optical device 170 provided with the mountable optical element 130 may be evaluated and further processed in a separate processing device that may contain the image processor 400 of FIG. 1B or that may be a computer system executing a computer program for depth estimation and defocus image recovery as performed by the image processor 400 of FIG. 1B.

The following figures describe the optical element 130 with reference to its PSF. A PSF of an imaging system describes the response of an imaging system to a point source or a point-like object. In other words a PSF of an imaging system describes the intensity distribution obtained when the imaging system acquires an image of the point-like object. According to an embodiment, the PSF of the imaging system 100 does not depend on the position of the point-like object in the object plane, but only depends on the position of the point-like object along the optical axis, i.e. on its defocus value, wherein a defocus of 0 corresponds to an infocus point-like object. Typically, a PSF maps a point-like object into an image area. The PSF varies for different defocus values, and for each defocus value a separate PSF needs to be determined.

FIGS. 2A to 2C show examples of resulting intensity distributions calculated from different kinds of PSFs at different defocus values, respectively. In the following, a main lobe of a PSF is an image area with a maximum intensity and a side lobe is an image area with a local maximum intensity, lower than a maximum intensity in the main lobes. A PSF may have a plurality of main lobes and a plurality of side lobes. A PSF may also contain a single main lobe without side lobes. The optical axis of the concerned optical system coincides with the origins of the coordinate systems in FIGS. 2A to 2C.

FIG. 2A shows an example of an intensity distribution of an SPSF at normalized defocus values ranging from −2 to 2. In 200A-0 the focused (defocus value 0) point-like object is mapped into an image area 220A around the origin with small side lobes. A connecting line linking the side lobes is oriented along the abscissa. In 200A-1B a point-like object at defocus value 1 is mapped into two main lobes 221A-1Bb, 221A-1Ba. A connecting line linking the two main lobes 221A-1Bb, 221A-1Ba is oriented along the abscissa. In 200A-2B a point-like object at defocus value 2 is mapped into two main lobes 221A-2Bb, 221A-Ba which are larger than the main lobes in 200A-1B, and further side lobes on the left side of main lobe 221A-2Bb and on the right side of main lobe 221A-2Ba. A connecting line linking the main lobes 221A-2Bb, 221A-Ba is oriented along the abscissa.

Neither rotation nor slanting occurs. Furthermore the SPSFs with the same absolute defocus value, i.e. 220A-1A, 220A-1B and 220A-2A, 220A-2B, are identical for the given example. The SPSF results in image areas spreading outwards from the origin with increasing absolute defocus value along the same axis. SPSFs of positive and negative defocus values cannot be distinguished.

FIG. 2B shows an example of an intensity distribution of an RPSF with two main lobes at normalized defocus values ranging from −2 to 2. In 200B-0 the focused point-like object is mapped into two main lobes 221B-a, 221B-b. A connecting line linking the two main lobes 221B-a, 221B-b is parallel to the abscissa. In 200B-1B a point-like object at defocus value 1 is mapped into two main lobes 221B-1Bb, 221B-1Ba. A connecting line linking the two main lobes 221B-1Bb, 221B-1Ba is rotated clockwisely with respect to 200B-0. In 200B-2B a point-like object at defocus value 2 is mapped into two main lobes 221B-2Bb, 221B-2Ba. A connecting line linking the two main lobes 221B-2Bb/221B-2Ba is further rotated clockwisely with respect to 200B-0 and 200B-1B. In 200B-1A a point-like object having defocus value −1 is mapped into two main lobes 221B-1Ab, 221B-1Aa. A connecting line linking the two main lobes 221B-1Ab/221B-1Aa is rotated counter-clockwisely with respect to 200B-0. In 200B-2A a point-like object at defocus value −2 is mapped into two main lobes 221B-2Ab, 221B-2Aa. A connecting line linking the two main lobes 221B-2Ab, 221B-2Aa is further rotated counter-clockwisely with respect to 200B-0 and 200B-1A. Though side lobes are not present in this example, other RPSFs may also feature side lobes, only one main lobe, or e.g. an elliptical shape.

The RPSF is periodic along the optical axis and the same intensity distribution may appear both at a negative defocus value and at a positive defocus value, complicating the retrieval of depth information.

FIG. 2C shows an intensity distribution of an FPSF according to an embodiment including two main lobes at normalized defocus values ranging from −2 to 2. In 200C-0 the focused point-like object is mapped into two main lobes 221C-a, 221C-b. A connecting line linking the two main lobes 221C-a, 221C-b is oriented along the ordinate. In 200C-1B a point-like object at defocus value 1 is mapped into a plurality of image areas, which are significantly increased in size with respect to 200C-0, and which include two main lobes 221C-1Bb, 221C-1Ba. A connecting line linking the two main lobes 221C-1Bb/221C-1Ba is oriented along a first axis 230C-1B, which is rotated clockwisely with respect to 200C-0. In 200B-2B a point-like object at defocus value 2, hence further increasing defocus with respect to 200C-0 and 200C-1B, is mapped into the image areas further increased in size with respect to 200C-0 and 200C-1B and including two main lobes 221C-2Bb, 221C-2Ba. A connecting line linking the two main lobes 221C-2Bb, 221C-2Ba is again oriented in substance along the first axis 230C-2B. In 200C-1A a point-like object at defocus value −1 is mapped into a plurality of image areas, which are increased in size with respect to 200C-0 and which include two main lobes 221C-1Ab, 221C-1Aa. A connecting line linking the two main lobes 221C-1Ab, 221C-1Aa is oriented along a second axis 230C-1A, rotated counter-clockwisely with respect to the connecting line in 200C-0. In 200C-2A a point-like object having defocus value −2 is mapped into the image areas further increased in size with respect to 200C-0 and 200C-1A and includes two main lobes 221B-2Ab, 221B-2Aa. A connecting line linking the two main lobes 221B-2Ab/221B-2Aa is oriented in substance along the second axis 230C-2A.

The shapes of the image areas of the FPSF in FIG. 2C at the same absolute defocus value are approximately mirror images e.g. with respect to the bisectrix of the first and the second axis 230C-1B, 230-1A, which coincides with the ordinate. Main and side lobes of the FPSF change significantly in shape and intensity with increasing absolute defocus value.

In more general, a distance between the optical axis and balance points, local intensity maxima, and/or lobes of image areas increases with increasing negative defocus, wherein the balance points, local intensity maxima, and/or lobes are arranged more or less oriented along the first axis 211. In addition, the respective image area or PSF size 221C-1A, 221C-2A increases with increasing negative defocus values.

As regards the positive defocus, the balance points, local intensity maxima and/or lobes are arranged along a second axis 212 which is rotated against the first axis 211. For the illustrated FPSF, an angle α between the first and second axis 211, 212 is about 90 degree. The image areas of corresponding negative and positive defocus positions are approximated mirror images of each other.

Other than RPSFs, the FPSFs do not rotate around a z axis along the optical axis with increasing negative or positive defocus such that a distribution of lobes, balance points, and/or local maxima is not periodic along the z axis. The angle α between the first and second axes 211, 212 allows discriminating between positive and negative defocus and the modulation of the image areas along the z axis allows depth estimation by deconvolution.

The positions of the lobes or balance points may fluctuate within an angle range of +/−45 degree, but do not rotate.

FPSFs may be generated by a superposition of suitable GL (Gauss-Laguerre) modes GL(m,n), wherein m is the radial index and n is the azimuthal index. For example, the FPSF illustrated in FIG. 2C may be obtained by superposition of selected GL modes that include two GL modes along a slanted line in the GL modal plane, wherein both modes have positive azimuthal and radial indices, combined with at least two GL modes on a horizontal line in the GL modal plane. According to an embodiment the selected modes include at least two of the GL modes GL(0,0), GL(1,3), and GL(2,6) along with their neighboring GL modes. According to another embodiment, the selected GL modes include the GL modes GL(0,0), GL(1,3), and GL(2,6) and some neighboring GL modes on a horizontal line, wherein the weights of the neighboring GL modes on the horizontal line may be lower than the weights of the GL modes GL(0,0), GL(1,3), and GL(2,6).

According to a further embodiment, the selected GL modes include the GL modes GL(1,1), GL(2,4), GL(3,7) in combination with the GL(−2,2), GL(0,2), GL(2,2) modes and neighboring modes, wherein the weights of the neighboring GL modes are lower than the weights of the modes GL(1,1), GL(2,4), GL(3,7), GL(−2,2), GL(0,2), GL(2,2). According to yet another embodiment, the selected GL modes include the GL modes GL(1,1), GL (3,5), GL(5,9) in combination with GL(−3,3), GL(−1,3), GL(0,3), GL(1,3) and GL(3,3) with or without neighboring modes, wherein the weights of the neighboring GL modes are lower than the weights of the GL modes GL(1,1), GL (3,5), GL(5,9), GL(−3,3), GL(−1,3), GL(0,3), GL(1,3).

FIG. 3A shows selected GL modes in the modal plane for two different SPSFs. A combination of GL modes on the continuous horizontal line results in the SPSFs as shown in the upper row in FIG. 3C. A combination of GL modes on the dashed horizontal line results in the SPSFs as shown in the lower row in FIG. 3C.

Figure 3B:
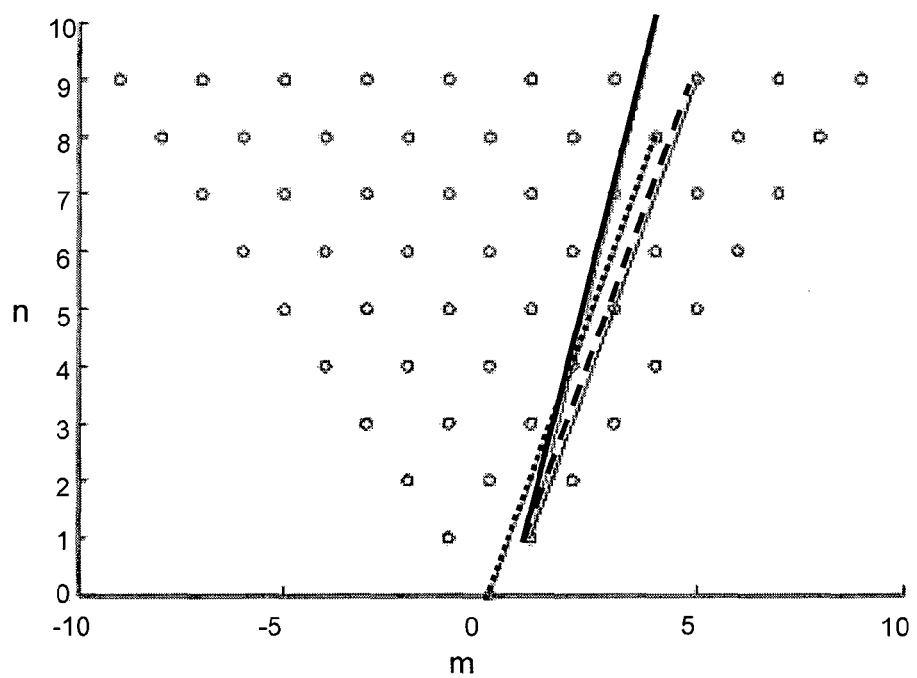
FIG. 3B is schematic diagram plotting GL modes for generating different RPSF masks in a GL modal plane.
Figure 3C:
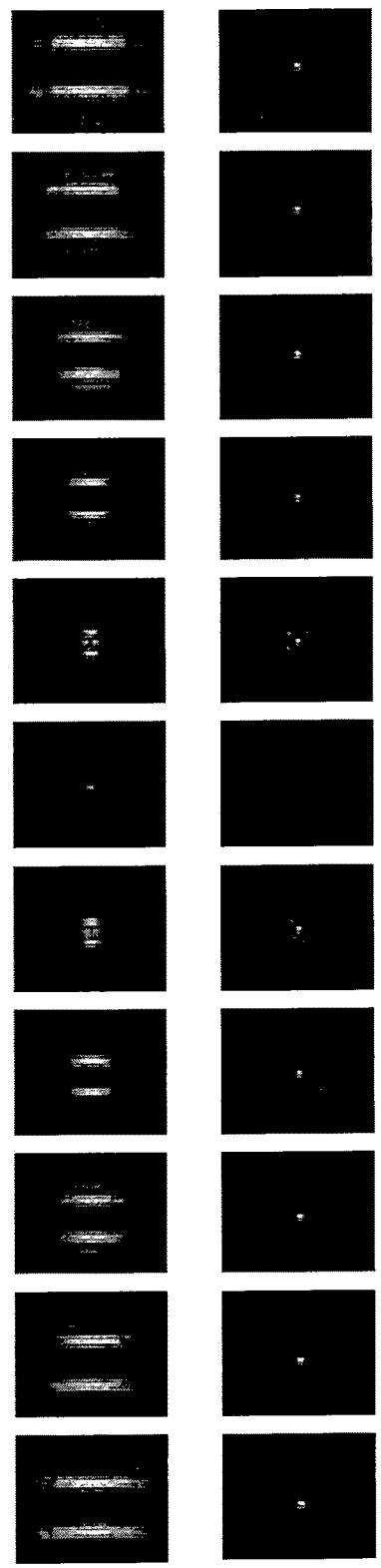
FIG. 3C is a schematic diagram plotting the SPSFs as indicated in the GL modal plane on FIG. 3A for different defocus values.

FIG. 3B shows selected GL modes in the modal plane for three different RPSFs. A combination of GL modes on the continuous line results in the RPSF shown in the top row in FIG. 3D. A combination of GL modes on the dashed line results in the RPSF shown in the middle row in FIG. 3D. A combination of GL modes on the slanted dotted line results in the RPSF shown in the bottom row in FIG. 3D.

Figure 3D:
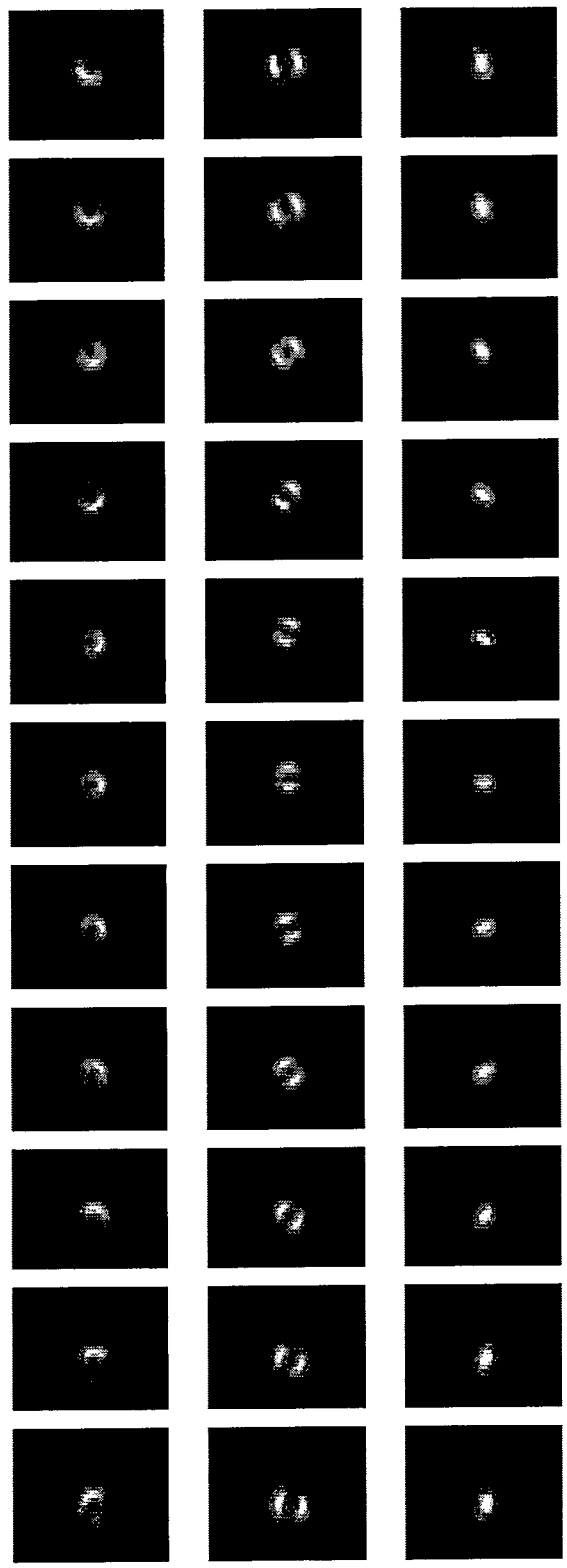
FIG. 3D is a schematic diagram plotting the RPSFs as indicated in the GL modal plane on FIG. 3B for different defocus values.
Figure 3E:
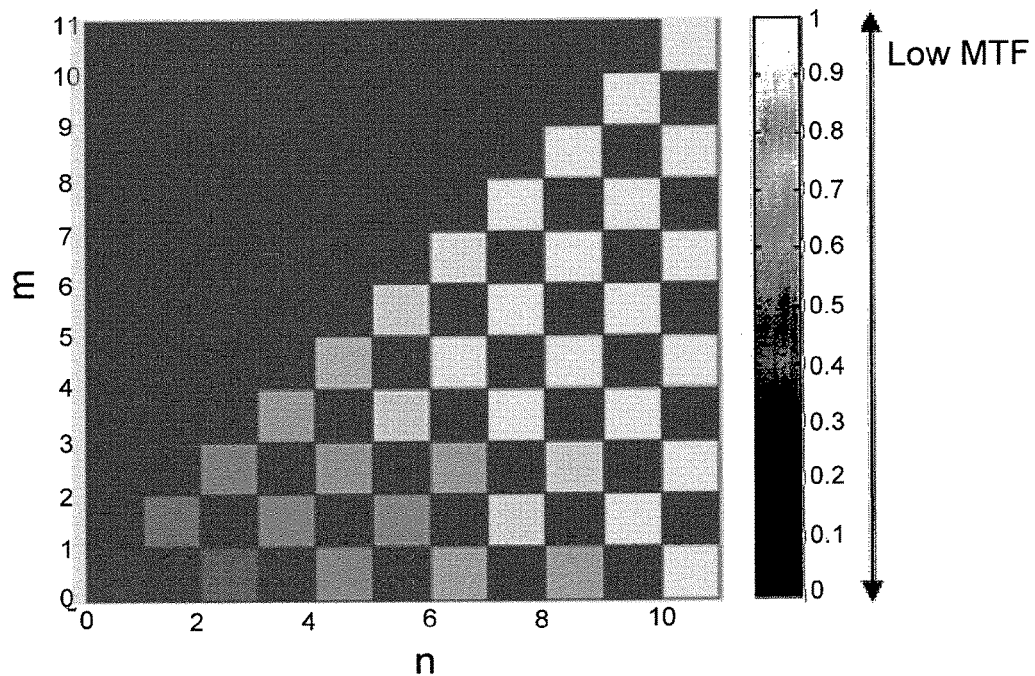
FIG. 3E is a grey scale diagram visualizing characteristic values of MTFs (modulation transfer functions) of GL modes for illustrating the selection of GL modes for defining an FPSF according to a further embodiment.

FIG. 3E relates to the selection of GL modes. For each existing GL mode a characteristic value of the corresponding MTF is evaluated. The characteristic value may be descriptive for an upper spatial frequency up to which the magnitude of the MTF exceeds a predetermined minimum value. According to another embodiment the characteristic value may be descriptive for the magnitude at a predetermined upper spatial frequency threshold. According to yet a further embodiment the characteristic value may be descriptive for the integral of the normalized MTF over the horizontal and/or vertical spatial frequency responses. The remaining GL modes are ranked according to their characteristic MTF values and may be selected in the order of their ranks.

In FIG. 3E grey tones visualize the characteristic MTF values, wherein high characteristic MTF values correspond to dark grey values and low characteristic MTF values correspond to light gray values. The modes GL(0,0), GL(1,3), and GL(2,6) have comparable high characteristic MTF values and are selected as main modes. Some auxiliary modes are added.

Figure 3F:
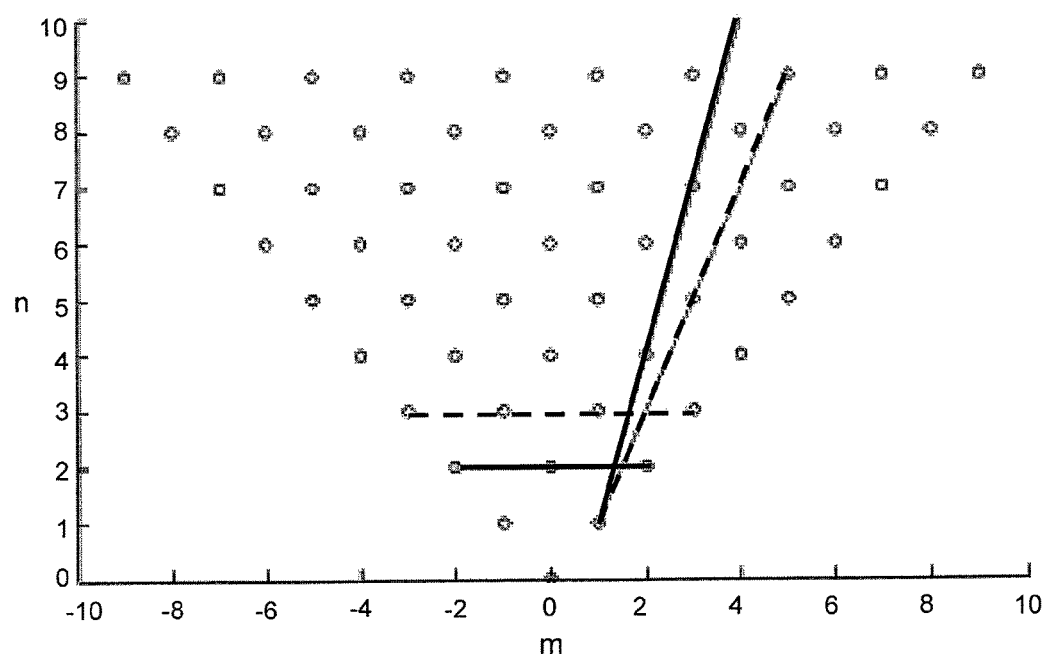
FIG. 3F is a schematic diagram plotting selected GL modes for generating FPSF masks in a GL modal plane.
Figure 3G:
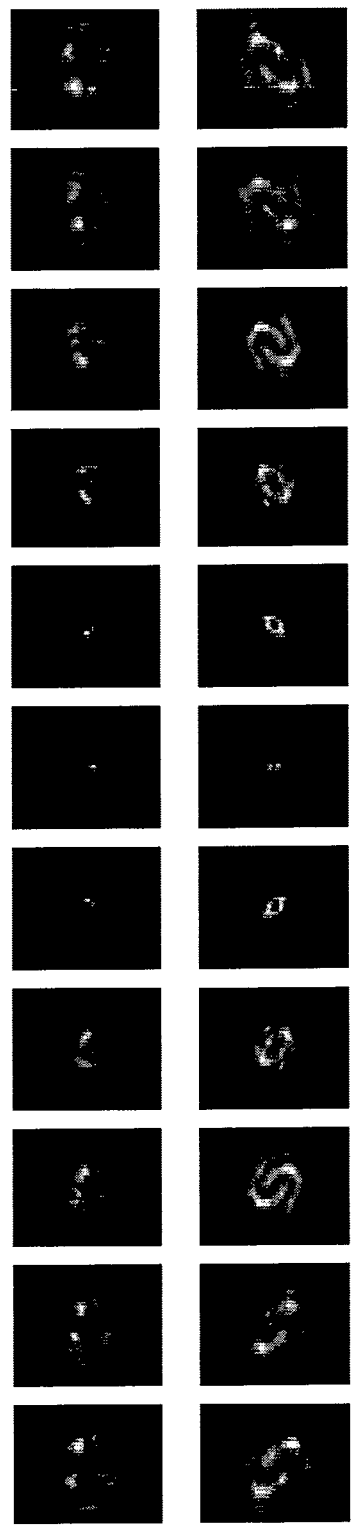
FIG. 3G is a schematic diagram plotting the FPSFs indicated in the GL modal plane of FIG. 3E.

FIG. 3F shows selected GL modes in the modal plane for two different FPSFs. A combination of GL modes on the continuous lines results in the FPSF shown in the top row in FIG. 3G. A combination of GL modes on the dashed lines results in the FPSF shown in the bottom row in FIG. 3G.

The selected GL modes may be weighted with respect to each other when superposed. According to an embodiment, all selected GL modes may have the same weights. Other embodiments may provide the GL(0,0), GL(1,3), and GL(2,6) modes with first weights and the auxiliary modes with second weights, wherein each second weight is lower than each of the first weights.

According to a further embodiment the weights of the selected and auxiliary GL modes are direct proportional to a characteristic value of the MTF, wherein the characteristic value may be one of that described above and wherein the characteristic value may be derived from the horizontal MTF, from the horizontal MTF, or from both.

According to an embodiment, assigning the weight is based on a maximum normalized spatial frequency, where a normalized horizontal MTF is higher than a threshold value, e.g., 0.1. According to another embodiment, the weight is based on a maximum normalized spatial frequency, where a normalized vertical MTF is higher than a threshold value, e.g., 0.1.

According to an embodiment, the weight of a GL mode is based on the integral of at least one of its MTFs, e.g., the horizontal MTF, the vertical MTF or the total MTF. According to an embodiment, the integral is calculated using a numerical integration technique. For example, the numerical integration technique is the Simpsons Rule, or the trapezoidal Rule. According to another embodiment, the integral is calculated using a right angled triangle approximating the MTF.

Figure 3H:
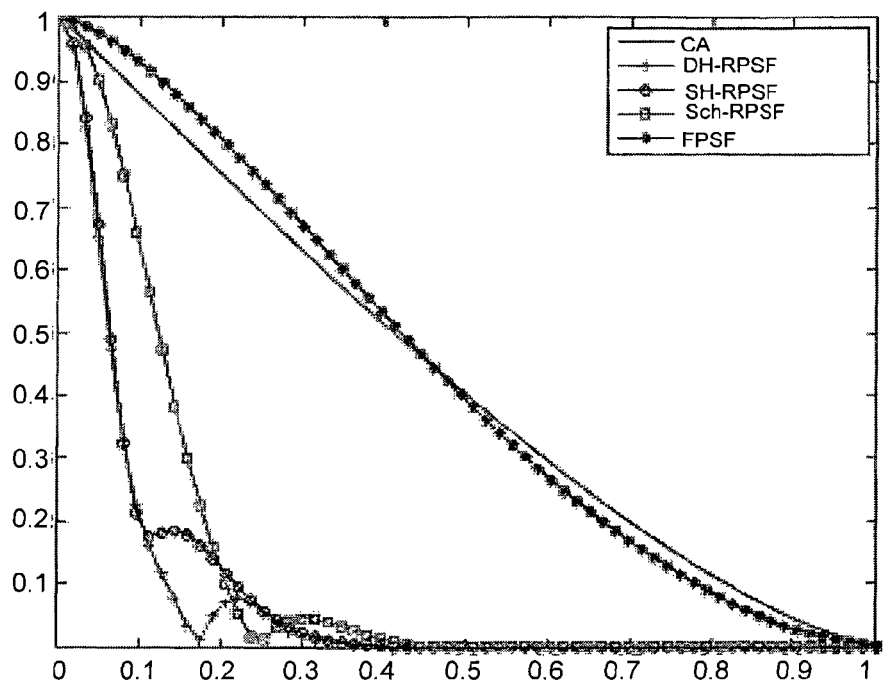
FIG. 3H is a schematic diagram plotting normalized MTFs of different phase masks against the normalized horizontal spatial frequency for illustrating effects of the embodiments.
Figure 3I:
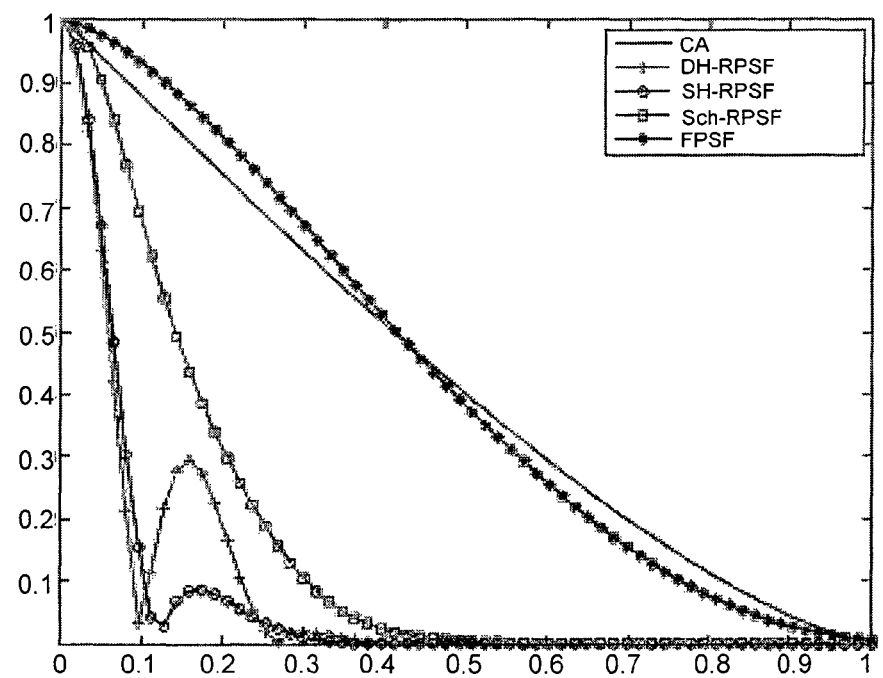
FIG. 3I is a schematic diagram plotting normalized MTFs of the phase mask of FIG. 4B against the normalized vertical spatial frequency for illustrating effects of the embodiments.

FIG. 3H plots the normalized MTF of a double-helix-RPSF (DH-RPSF), a single helix-RPSF (SH-RPSF), a Schechner RPSF (SRPSF), and an FPSF over the normalized horizontal spatial frequencies. FIG. 3D shows the corresponding MTFs in vertical direction. For RPSFs the cut-off spatial frequency, for which the MTF is lower than a predetermined threshold, e.g. 0.1, is significantly lower than for the FPSF. As a consequence, the RPSFs provide less light and lower resolution than FPSFs.

Figure 4A:
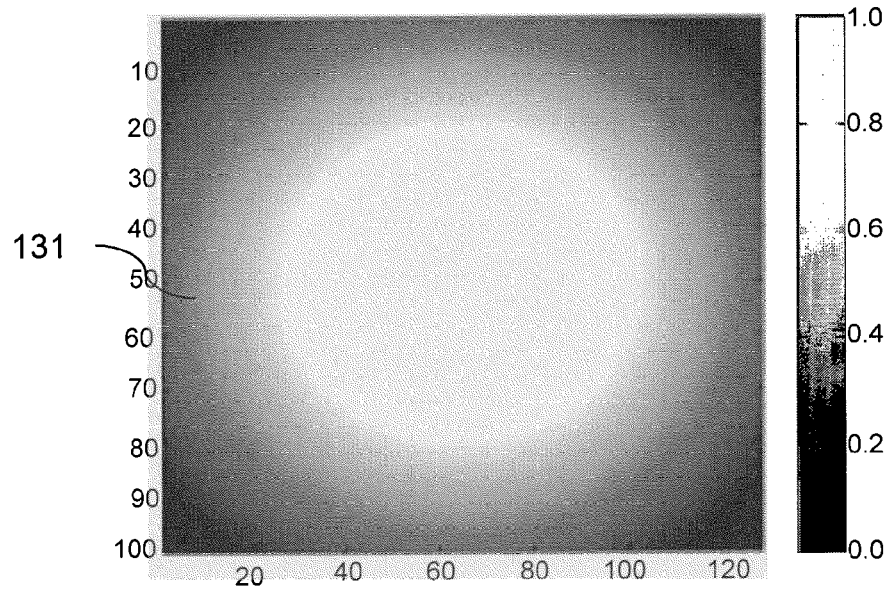
FIG. 4A is a schematic plan view of an amplitude mask of an optical system according to a further embodiment.
Figure 4B:
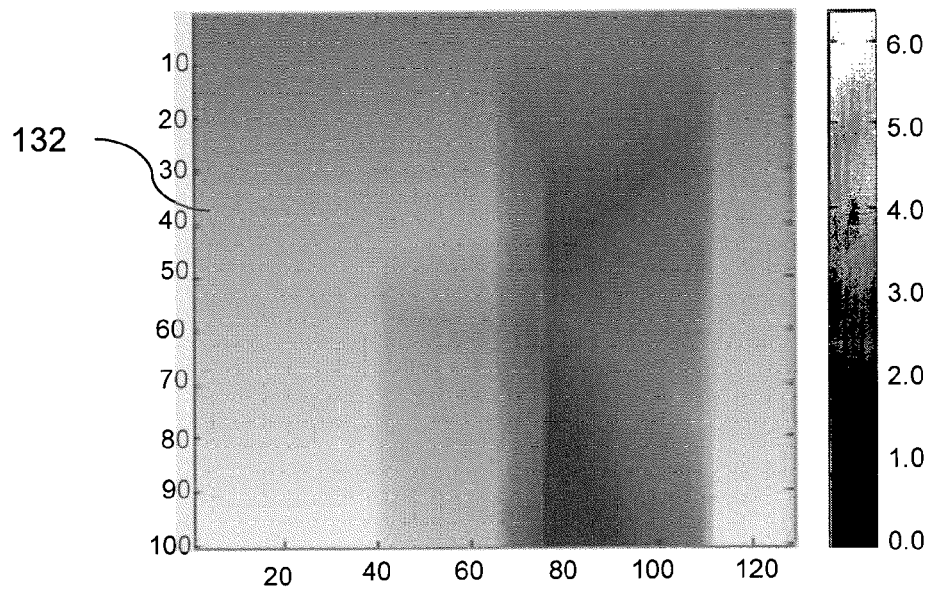
FIG. 4B is a schematic plan view of a phase mask of an optical system according to another embodiment.

FIGS. 4A and 4B refer to a two-part embodiment of the optical element 130 of FIG. 1A. For a two-part embodiment, the superposition of GL modes may be separated into a pure or mainly amplitude component and a pure or mainly phase component. The amplitude component may be implemented by an amplitude mask and the phase component may be implemented by a phase mask.

According to an embodiment, the optical element 130 of FIG. 1A, 1B or 1C includes an amplitude mask 131 illustrated in FIG. 4A and a phase mask 132 illustrated in FIG. 4B. The phase mask 132 may be obtained by modulating phase characteristics of a first optical blank such that it represents the phase components of the weighted GL modes. The amplitude mask 131 may be obtained by modulating amplitude characteristics of the first or a second optical blank such that it represents the amplitude components of the weighted GL-modes.

Figure 5A:
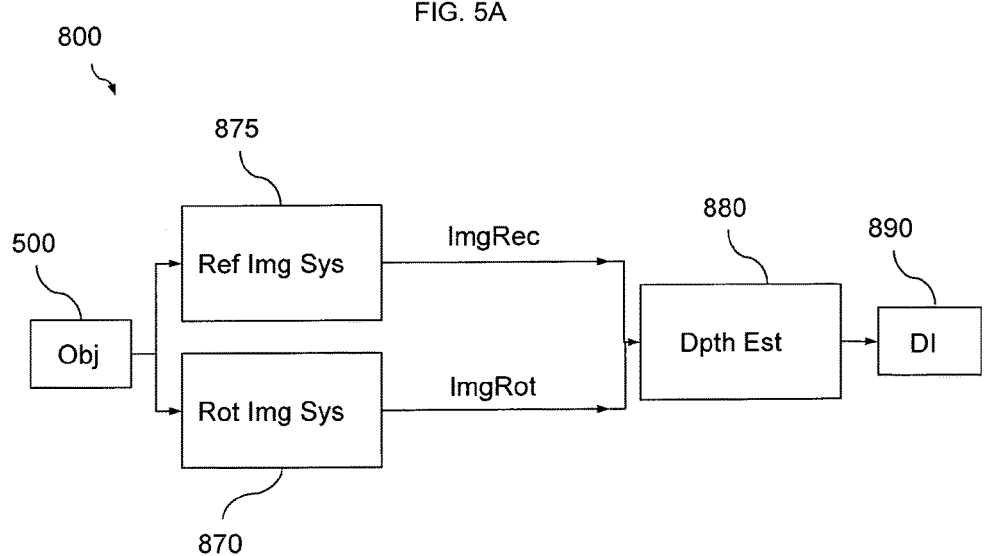
FIG. 5A is a schematic block diagram of an electronic device providing depth estimation on the basis of an RPSF for discussing effects of the embodiments.

According to another embodiment the amplitude mask 131 is not defined by the GL modes but is a constant amplitude mask. According to a further embodiment the amplitude mask 131 is a Gaussian apodization amplitude mask as shown in FIG. 5A. For example the aperture mask is simulated for different sigmas for a Gaussian distribution as given in equation (1):

$$G(x, y) = (1/2\prod \sigma^2)\exp\left(-\frac{x^2 + y^2}{2\sigma^2}\right)$$

taking care of the MTF, shape and size of the PSF.

FIG. 4B shows an example of a phase mask 132 embodying the GL modes GL(0,0), GL(1,3), GL(2,6). The phase mask 132 may be a glass disc whose thickness is modulated according to the phase shift described by the GL modes.

FIG. 5A shows an optical system 800 for depth estimation using an RPSF. A reference imaging section 875 records a reference image ImgRef of a scene 500 without using an RPSF. A rotating imaging section 870 records a blurred image ImgRot of the scene 500, wherein the blurring is introduced by an optical element embodying an RPSF. From the two images ImgRot, ImgRef, an image processor 880 evaluates a depth map 890. The optical system 800 may output the depth information DI, e.g., to another device or may further process the depth information DI. Typically, the optical system 800 is a stereoscopic optical system recording the reference image ImgRef and the rotated image ImgRot simultaneously or a monoscopic optical system with only one optical path and image sensor, wherein an optical element applying the RPSF is temporarily inserted in the optical path and the reference and rotated images ImgRef, ImgRot are recorded sequentially.

Figure 5B:
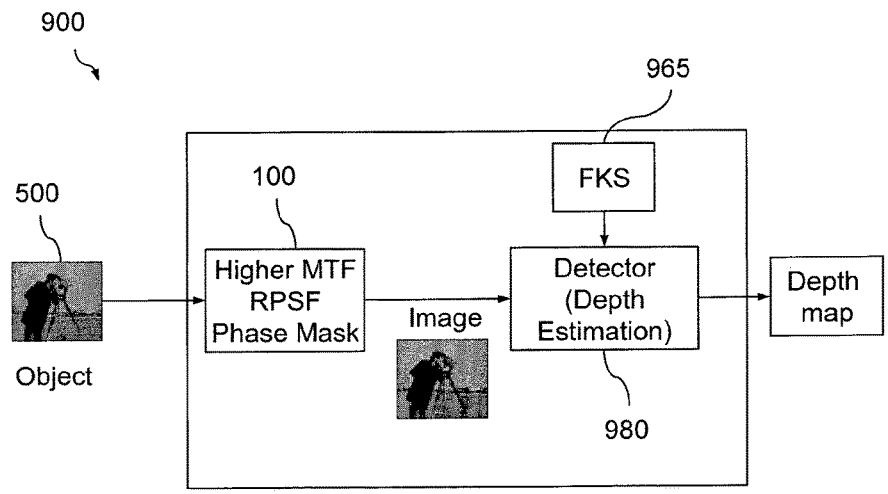
FIG. 5B is a schematic block diagram of an apparatus in accordance with an embodiment providing depth recovery.

FIG. 5B shows an apparatus 900 for single shot depth estimation and image acquisition. An optical system 100 records a image ImgBI of a scene 500 using an FPSF. An image processor 980 analyzes the blurred defocus images and provides depth information DI and/or a recovered defocus image ImgRec using a filter kernel set 965.

According to an embodiment, the depth information DI is used to recover the image corresponding to the depth of the scene 500. According to another embodiment, the scene 500 contains a plurality of objects and a depth of the recovered image can be chosen by user input, or a recovering depth may be calculated from the average depth of the plurality of objects contained in the scene 500. According to yet another embodiment, a set of recovered images is computed for every object contained in the scene image according to the depth of the respective object.

Figure 6:
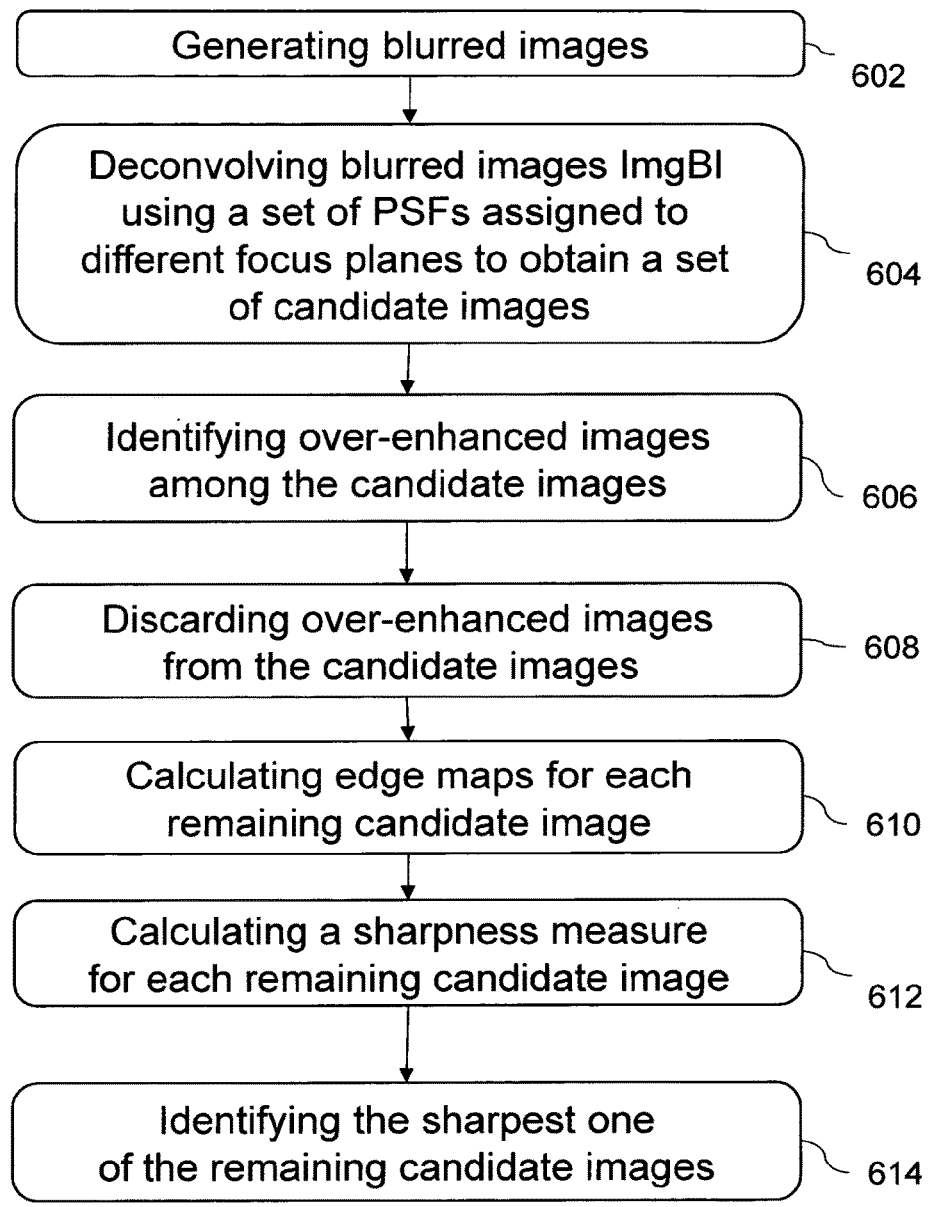
FIG. 6 is a schematic flow chart of a depth estimation and defocus image recovery method in accordance with a further embodiment.

FIG. 6 is a flow chart of a method for depth estimation in an image recorded with the optical device 100 of FIG. 1A. A blurred defocus image is recorded using an FPSF (602). Then, the blurred defocus image is deconvolved with a set of $PSF_i$ to generate a set of deconvolved images (604). The index i denotes a defocus of the $PSF_i$ in terms of a predefined distance between the defocus planes of the PSF. Each $PSF_i$ corresponds to a defocus position i.

The over-enhanced images are identified as outliers (606) and discarded (608). Over-enhanced images typically occur when a blurred defocus image 150 with positive or negative defocus i is deconvolved by a PSF having a defocus greater than absolute value i for positive defocus values, or when deconvolved by a PSF having a defocus lower than absolute value of i for negative defocus values. The over-enhanced images among the set of deconvolved images may be identified by various methods.

According to an embodiment, over-enhanced images may be identified by analyzing the variance of the images. According to another embodiment, identifying over-enhanced images includes comparing the gradients of images. The method of comparing the gradients of images computes the gradients $Gr(x_i)$ of the deconvolved images $x_i$. For positive defocus deconvolved images, the ratio of the gradients $Gr(x_i)$ and $Gr(x_{i+1})$ is computed. If the ratio of the gradients $Gr(x_i)$ and $Gr(x_{i+1})$ is greater than a predefined threshold, the image $x_{i+1}$ is classified as over-enhanced and discarded. For negative defocus deconvolved images, the ratio of gradients $Gr(x_i)$ and $Gr(x_{i-1})$ is computed. If the ratio of the gradients $Gr(x_i)$ and $Gr(x_{i-1})$ is greater than the predefined threshold, the image $x_{i-1}$ is identified as over-enhanced and discarded.

Edge maps may be calculated for the remaining candidate images $X_i$ (610). From each edge map, a sharpness measure of each of the remaining candidate images is calculated (612). Any known sharpness measure can be applied. The sharpness measures of the remaining candidate images are compared with each other and the sharpest image is identified (614). From the defocus assigned to the $PSF_i$ whose deconvolution result delivers the sharpest image, the depth of an object in the image can be calculated.

According to an embodiment, the method of the local phase coherence (LPC) may be used to calculate the sharpness of the image. A local phase coherence map $LPX_i$ is calculated and a bilateral filter is applied to smoothen the local phase coherence maps to get the smoothened local coherence maps $BLX_i$. From the set of $BLX_i$, the maximum per pixel value is computed and thus the sharpest image is identified. From the defocus of the sharpest image the depth of the objects in the image may be calculated.

Figure 7A:
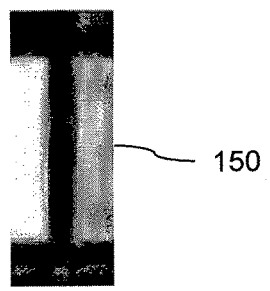
FIG. 7A shows a blurred defocus image obtained from a scene using an FPSF for illustrating a depth estimation and defocus image recovery method according to a further embodiment.
Figure 7B:
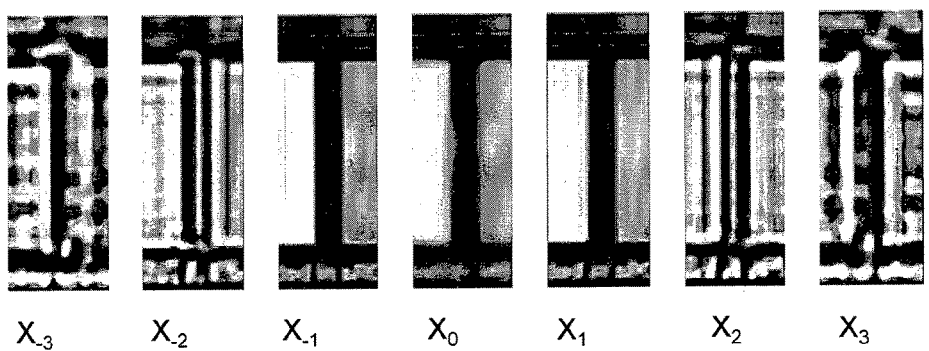
FIG. 7B shows a set of images obtained by deblurring the blurred defocus image of FIG. 7A by deconvolving the blurred defocus image with predefined FPSFs at different predefined defocus positions for illustrating the depth estimation and defocus image recovery method mentioned in FIG. 7A.

FIGS. 7A and 7B visualize the method of depth estimation and image recovery as discussed in FIG. 6. FIG. 7A shows a blurred defocus image 150 of a portion of a scene which is out of focus at a defocus of −1.

FIG. 7B shows a set of deconvolved images $x_i$ generated by deconvolving the blurred defocus image 150 using a set of $PSF_i$. The deconvolved images $x_3$, $x_2$, $x_{-2}$ and $x_{-3}$ are examples of over-enhanced images, because their defocus is greater than the defocus of the blurred defocus image. Thus they outliers and can be discarded from further considerations. Over-enhanced images can be identified based on a contrast, because they show additional structures, such as additional edges, additional lines, or dots.

The remaining set of candidate images $X_i$ contains, e.g., the images $x_{-1}$, $x_0$, $x_1$. Applying a sharpness measure yields that image $x_{-1}$ is the sharpest image and represents best the original image. The depth of the concerned portion of the scene may be derived from the defocus of the corresponding $PSF_i$. The sharpest image may be used for getting all in focus images.

Figure 8:
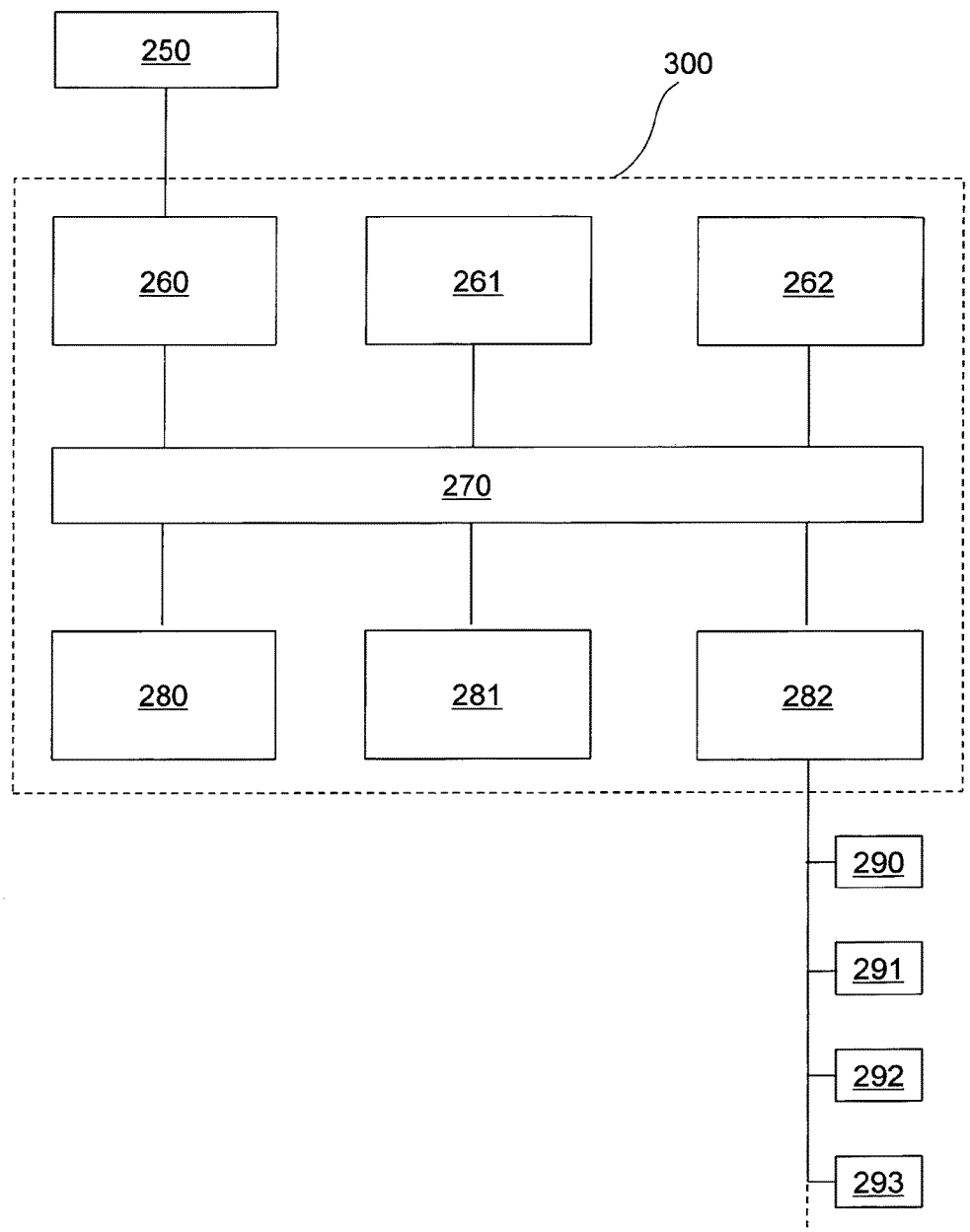
FIG. 8 is a schematic functional block diagram of a processor system according to a further embodiment.

FIG. 8 is a block diagram of a processing system 300 embodying aspects of this disclosure including aspects involving a computer utilized to estimate the depth of a blurred defocus image and to recover an original image from the blurred defocus image. The processes, algorithms and electronically driven systems described herein can be implemented via a discrete control device or computing system consistent with the structure shown in FIG. 8. Such a system is described herein as a processing system 300.

The processing system 300 can be implemented using a microprocessor or its equivalent, such as a central processing unit 281 (CPU) or at least one application specific processor ASP. The microprocessor utilizes a computer readable storage medium, such as a memory 261 (e.g., ROM, EPROM, EEPROM, flash memory, static memory, DRAM, SDRAM, and their equivalents), that control the microprocessor to perform and/or control the process of depth estimation and/or image recovery. Other storage mediums can be controlled via a controller, such as a disk controller 262, which controls a hard disk drive or optical disk drive.

The microprocessor or aspects thereof, in an alternate embodiment, can include or exclusively include a logic device for augmenting or fully implementing the depth estimation and image recovery method as described above. Such a logic device includes, but is not limited to, an application-specific integrated circuit (ASIC), a field programmable gate array (FPGA), a generic-array of logic (GAL), and their equivalents. The microprocessor may be a separate device or a single processing mechanism.

A video controller 260 may or may not use the depth information to render a 3D image that can be displayed on a monitor 250. The video controller 260 may include a graphic processing unit for improved computational efficiency. Additionally, an I/O (input/output) interface 282 may be provided for inputting data from a keyboard 290 or a pointing device 291 for controlling parameters of the various processes and algorithms of this disclosure can be connected to the I/O interface to provide additional functionality and configuration options, or control display characteristics. The monitor 250 may include a touch-sensitive interface to a command/instruction interface. Other peripherals can be incorporated, including a scanner or a web cam when image-based data entry is used.

The components of the processing system 300 may be coupled to a network 285, such as the Internet or a local intranet, via a network interface 280 for the transmission or reception of data, including controllable parameters. The network provides a communication path to a mobile device, which can be provided by way of packets of data. A central BUS 270 may connect components of the processing system 300 with each other and provides at least one path for digital communication between them.

According to an embodiment the blurred defocus image ImgBI may be provided to the processing system 300 via the I/O interface 282. According to another embodiment, the blurred defocus image ImgBI is provided to processing system 300 via the network interface 280.

In so far as embodiments have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment.

(1) An optical system comprising:
an optical element arranged in an optical path of the optical system, wherein a point spread function of the optical element is configured to image out-of-focus object points with positive defocus value into image areas oriented along a first radial axis in an image plane and out-of-focus object points with negative defocus value into image areas oriented along a second radial axis in the image plane, wherein a distance of the image areas to an optical axis of the optical system increases with increasing absolute defocus value.

(2) An optical system according to (1) comprising:
an image sensor arranged in the image plane of the optical system, and
a lens system arranged in the optical path and adapted to focus an object point in an object plane onto the image sensor.

(3) An optical system according to (1) or (2), wherein:
an angle between the first and second radial axes is greater than 0 degree and less than 180 degrees.

(4) An optical system according to any one of (1) to (3), wherein:
a light transmission efficiency of the optical element is adapted to have a light efficiency of at least 70% of a clear aperture.

(5) An optical system according to any one of (1) to (4), wherein:
the optical element comprises a Gaussian apodization aperture mask as an amplitude mask.

(6) An optical system according to any one of (1) to (5), wherein:
the optical element comprises a clear circular or rectangular or any other shape aperture mask as an amplitude mask.

(7) An optical system according to any one of (1) to (6), wherein:
the point spread function of the optical element is defined by a combination of phase components of Gauss-Laguerre modes GL(m,n), with m being the radial index and n the azimuthal index.

(8) An optical system according to any one of (1) to (7), wherein:
the phase mask of the optical element includes a linear combination of phase components of at least two of the Gauss-Laguerre modes lying on a slanted line in the GL modal plane GL(0,0), GL(1,3), and GL(2,6) of the form GL(m,n) with m being the radial index and n the azimuthal index and at least two auxiliary modes having the same azimuthal index.

(9) An optical system according to (2), comprising
an image processor configured to estimate a depth of an object in a blurred image obtained by the image sensor, wherein depth estimation uses a set of predefined point spread functions assigned to different defocus planes.

(10) An optical system according to (9), wherein:
the image processor is configured to apply no enhancement on a captured image when the MTF of the optical element is the same or equivalent to that of a clear aperture imaging system.

(11) An optical system according to (9) or (10), wherein:
the image processor is configured to recover an image blurred by the optical element, and image recovery comprises deconvolving the blurred image with one of the predefined point spread functions.

(12) An optical system according to any one of (9) to (11), wherein:
the depth estimation comprises deconvolving the blurred image with the predefined point spread functions to obtain a set of candidate images, each candidate image assigned to a defocus assigned to the respective point spread function.

(13) An optical system according to (12), wherein:
the depth estimation comprises identifying and discarding over-enhanced images among the candidate images.

(14) An optical system according to (13), wherein
the image processor is configured to identify the over-enhanced images by determining and evaluating a ratio of gradients of candidate images assigned to two neighboring defocus planes.

(15) An optical system according to any one of (12) to (14), wherein
the depth estimation comprises obtaining a sharpness measure for at least some of the candidate images and identifying the predefined point spread function used to obtain a sharpest one of the candidate images.

(16) An optical system according to (15), wherein
the sharpest one of the candidate images is obtained based on evaluation of a local phase coherence.

(17) A method of operating an electronic device including an optical system, the method comprising:
imaging a scene onto an image sensor, wherein an optical element arranged in an optical path of the optical system images out-of-focus object points with positive defocus value into image areas oriented along a first radial axis and out-of-focus object points with negative defocus into image areas oriented along a second radial axis, wherein a distance of the image areas to an optical axis of the optical system increases with increasing absolute defocus value.

(18) A method according to (17), comprising
estimating a depth of an object in the scene from a blurred defocus image output by the image sensor by using a set of predefined point spread functions of phase and amplitude mask assigned to different defocus planes.

(19) A method according to claim (18), comprising:
deconvolving the blurred defocus image with the predefined point spread functions to obtain a set of candidate images, each candidate image assigned to a defocus assigned to the respective point spread function.

(20) A method according to claim (18), comprising:
recovering an unblurred defocus image of the scene from the blurred defocus image by deconvolving the blurred defocus image with one of the predefined point spread functions.

(21) An apparatus comprising:
optical means for imaging out-of-focus object points with positive defocus value into image areas oriented along a first radial axis in an image plane and out-of-focus object points with negative defocus value into image areas oriented along a second radial axis in the image plane, wherein a distance of the image areas to an optical axis of the optical system increases with increasing absolute defocus value.

Obviously, numerous modifications and variations of the present disclosure are possible in light of the above teachings. It is therefore to be understood that within the scope of the appended claims, the embodiments may be practiced otherwise than as specifically described herein.

The invention claimed is:

1. An optical system comprising:
an optical element arranged in an optical path of the optical system, wherein:
a point spread function of the optical element is configured to image out-of-focus object points with positive defocus value into image areas oriented along a first radial axis in an image plane and out-of-focus object points with negative defocus value into image areas oriented along a second radial axis in the image plane, wherein a distance of the image areas to an optical axis of the optical system increases with increasing absolute defocus value, wherein
a shape of the images of an out-of-focus object point at a positive defocus value is a mirror image of a shape of the images of an out-of-focus object point at a negative defocus value having the same absolute value as the positive defocus value, the mirror image being with respect to a bisectrix of the first radial axis and the second radial axis.

2. The optical system according to claim 1, comprising:
an image sensor arranged in the image plane of the optical system, and
a lens system arranged in the optical path and adapted to focus an object point in an object plane onto the image sensor.

3. The optical system according to claim 1, wherein:
an angle between the first and second radial axes is greater than 0 degree and less than 180 degrees.

4. The optical system according to claim 1, wherein:
a light transmission efficiency of the optical element is adapted to have a light efficiency of at least 70% of a clear aperture.

5. The optical system according to claim 1, wherein:
the optical element comprises a Gaussian apodization aperture mask as an amplitude mask.

6. The optical system according to claim 1, wherein:
the optical element comprises a clear circular or rectangular or any other shape aperture mask as an amplitude mask.

7. The optical system according to claim 1, wherein:
the point spread function of the optical element is defined by a combination of phase components of Gauss-Laguerre modes $GL(m,n)$, with m being the radial index and n the azimuthal index.

8. The optical system according to claim 1, wherein:
the phase mask of the optical element includes a linear combination of phase components of at least two of the Gauss-Laguerre modes lying on a slanted line in the GL modal plane $GL(0,0)$, $GL(1,3)$, and $GL(2,6)$ of the form $GL(m,n)$ with m being the radial index and n the azimuthal index and at least two auxiliary modes having the same azimuthal index.

9. The optical system according to claim 2, comprising an image processor configured to estimate a depth of an object in a blurred image obtained by the image sensor, wherein depth estimation uses a set of predefined point spread functions assigned to different defocus planes.

10. The optical system according to claim 9, wherein:
the image processor is configured to apply no enhancement on a captured image when the MTF of the optical element is the same or equivalent to that of a clear aperture imaging system.

11. The optical system according to claim 9, wherein:
the image processor is configured to recover an image blurred by the optical element, and image recovery comprises deconvolving the blurred image with one of the predefined point spread functions.

12. The optical system according to claim 9, wherein:
the depth estimation comprises deconvolving the blurred image with the predefined point spread functions to obtain a set of candidate images, each candidate image assigned to a defocus assigned to the respective point spread function.

13. The optical system according to claim 12, wherein:
the depth estimation comprises identifying and discarding over-enhanced images among the candidate images.

14. The optical system according to claim 13, wherein
the image processor is configured to identify the over-enhanced images by determining and evaluating a ratio of gradients of candidate images assigned to two neighboring defocus planes.

15. The optical system according to claim 12, wherein
the depth estimation comprises obtaining a sharpness measure for at least some of the candidate images and identifying the predefined point spread function used to obtain a sharpest one of the candidate images.

16. The optical system according to claim 15, wherein
the sharpest one of the candidate images is obtained based on evaluation of a local phase coherence.

17. A method of operating an electronic device including an optical system, the method comprising:
imaging a scene onto an image sensor, wherein an optical element arranged in an optical path of the optical system images out-of-focus object points with positive defocus value into image areas oriented along a first radial axis and out-of-focus object points with negative defocus into image areas oriented along a second radial axis, wherein a distance of the image areas to an optical axis of the optical system increases with increasing absolute defocus value, wherein
a shape of the images of an out-of-focus object point at a positive defocus value is a mirror image of a shape of the images of an out-of-focus object point at a negative defocus value having the same absolute value as the positive defocus value, the mirror image being with respect to a bisectrix of the first radial axis and the second radial axis.

18. The method according to claim 17, comprising
estimating a depth of an object in the scene from a blurred defocus image output by the image sensor by using a set of predefined point spread functions of phase and amplitude mask assigned to different defocus planes.

19. The method according to claim 18, comprising:
deconvolving the blurred defocus image with the predefined point spread functions to obtain a set of candidate images, each candidate image assigned to a defocus assigned to the respective point spread function.

20. The method according to claim 18, comprising:
recovering an unblurred defocus image of the scene from the blurred defocus image by deconvolving the blurred defocus image with one of the predefined point spread functions.

\* \* \* \* \*